United States Patent
Yano et al.

(10) Patent No.: US 6,817,758 B2
(45) Date of Patent: Nov. 16, 2004

(54) TEMPERATURE DISTRIBUTION MEASURING METHOD AND APPARATUS

(75) Inventors: Kenji Yano, Kasugai (JP); Misao Iwata, Nagoya (JP); Miyuki Hashimoto, Ichinomiya (JP); Kuniyuki Kitagawa, Nakatajutaku RJ-201, 9-3, Chikusa 1-chome, Chikusa-ku, Nagoya-shi, Aichi-ken (JP); Norio Arai, 99, Kachigawa-cho 4-chome, Kasugai-shi, Aichi-ken (JP)

(73) Assignees: Noritake Co., Limited, Nagoya (JP); Kuniyuki Kitagawa, Nagoya (JP); Norio Arai, Kasugai (JP)

( * ) Notice: Subject to any disclaimer, the term of this patent is extended or adjusted under 35 U.S.C. 154(b) by 51 days.

(21) Appl. No.: 10/095,692

(22) Filed: Mar. 13, 2002

(65) Prior Publication Data

US 2002/0146056 A1 Oct. 10, 2002

(30) Foreign Application Priority Data

Apr. 4, 2001 (JP) ........................................ 2001-105538

(51) Int. Cl.[7] .................................................. G01J 5/00
(52) U.S. Cl. ........................ 374/127; 374/121; 374/130
(58) Field of Search ................................ 374/120, 121, 374/130, 137, 127

(56) References Cited

U.S. PATENT DOCUMENTS

| | | | | |
|---|---|---|---|---|
| 3,611,805 A | * | 10/1971 | Hishikari | 374/127 |
| 3,654,809 A | | 4/1972 | Worden et al. | |
| 4,470,710 A | * | 9/1984 | Crane et al. | 374/127 |
| 4,619,533 A | * | 10/1986 | Lucas et al. | 374/141 |
| 4,659,234 A | * | 4/1987 | Brouwer et al. | 374/121 |
| 4,673,299 A | * | 6/1987 | Dakin | 374/131 |
| 4,764,025 A | * | 8/1988 | Jensen | 374/144 |
| 4,765,752 A | * | 8/1988 | Beynon et al. | 374/153 |
| 4,799,788 A | * | 1/1989 | Berthet et al. | 356/45 |
| 5,355,845 A | * | 10/1994 | Burgess et al. | 122/504 |
| 5,797,682 A | * | 8/1998 | Kert et al. | 374/123 |
| 6,050,722 A | * | 4/2000 | Thundat et al. | 374/121 |
| 6,357,910 B1 | * | 3/2002 | Chen et al. | 374/131 |

FOREIGN PATENT DOCUMENTS

| | | | | | |
|---|---|---|---|---|---|
| JP | 55144514 A | * | 11/1980 | ............. | G01J/5/60 |
| JP | 56046435 A | * | 4/1981 | ............. | G01J/5/02 |

(List continued on next page.)

Primary Examiner—Diego Gutierrez
Assistant Examiner—Mirellys Jagan
(74) Attorney, Agent, or Firm—Oliff & Berridge, PLC (57) ABSTRACT

Method and apparatus for measuring a surface temperature of an object body, by calculating a temperature at each picture element of an image of the object body, on the basis of a radiant intensity ratio at each pair of corresponding picture elements of a first and a second image which are obtained with respective radiations having respective first and second wavelengths which are selected from a light emitted from the surface of the body, by a first filter which permits transmission therethrough a radiation having the first wavelength which is selected according to a radiant intensity curve corresponding to a wavelength of a black body at a lower limit of a temperature measurement range, and which is within a high radiant intensity range in which the radiant intensity is higher than a radiant intensity at a normal room temperature, and a second filter which permits transmission therethrough a radiation having the second wavelength which is selected within the high radiant intensity range, such that the second wavelength is different from the first wavelength by a predetermined difference which is not larger than $\frac{1}{3}$ of the first wavelength and which is not smaller than a sum of half widths of the first and second wavelengths.

10 Claims, 5 Drawing Sheets

FOREIGN PATENT DOCUMENTS

| | | | | | |
|---|---|---|---|---|---|
| JP | 56046436 A | * 4/1981 | ............ | G01J/5/02 |
| JP | 57077921 A | * 5/1982 | ............ | G01J/5/02 |
| JP | 58139037 A | * 8/1983 | ............ | G01J/5/60 |
| JP | 58169038 A | * 10/1983 | ............ | G01J/5/60 |
| JP | A 59-94025 | 5/1984 | | |
| JP | A 59-94025 A | 5/1984 | | |
| JP | A 6-347330 | 12/1994 | | |
| JP | B2 7-6844 | 1/1995 | | |
| JP | A 7-301569 | 11/1995 | | |
| JP | 07301569 A | * 11/1995 | ............ | G01J/5/60 |
| JP | 08-226854 | 9/1996 | | |
| JP | 2002-527769 | 8/2002 | | |

* cited by examiner

TEMPERATURE DISTRIBUTION MEASURING METHOD AND APPARATUS

This application is based on Japanese Patent Application No. 2001-105538 filed Apr. 4, 2001, the contents of which are incorporated hereinto by reference.

BACKGROUND OF THE INVENTION

1. Field of the Invention

The present invention relates to a method and an apparatus which permit accurate measurement of a distribution of surface temperature of an object made of a plurality of different materials the emissivity values of which are not known.

2. Discussion of Related Art

It is sometimes necessary to accurately measure a distribution of temperature, for example, a distribution of a surface temperature of an article placed within a firing or heating furnace, or a distribution of a surface temperature of a heat-generating body. There has been proposed a surface-temperature distribution measuring apparatus which uses an image sensor operable to obtain two images of an object body with respective radiations of different wavelengths selected from an optical energy or light emitted from the object body. This measuring apparatus is arranged to obtain a ratio of radiant intensity values at each pair of corresponding local portions of the obtained two images, and measure the surface temperature of the object body, while utilizing the principle of measurement by a dichroic thermometer. JP-B2-6844 discloses an example of such a surface-temperature distribution measuring apparatus. The apparatus disclosed in this publication is adapted to calculate a distribution of the surface temperature of the object body, on the basis of the ratio of the actual radiant intensity values corresponding to the two different wavelengths, and according to a predetermined equation based on a known relationship between the radiant intensity ratio and the surface temperature. According to this apparatus, the calculation is possible even where the emissivity on the surface of the object body is unknown.

The measuring apparatus disclosed in JP-B2-7-6844 uses an image receiver in the form of a television camera, to detect the radiant intensity values corresponding to the three primary colors RGB (e.g., red color of 590 nm, green color of 530 nm and blue color of 460 nm) of light from the object body, and obtain a plurality of sets of radiant intensity ratios of two colors of the three primary colors, for example, of R and G. The measuring apparatus is arranged to convert the obtained radiant intensity ratios into the surface temperature of the object body according to a predetermined theoretical curve with a compensating function, and display a distribution of the surface temperature.

The conventional surface-temperature distribution measuring apparatus described above uses the selected two colors of the three primary colors of light of the object body. However, the radiant intensity ratio of the selected two colors cannot be considered to be a ratio of the two radiations having the predetermined wavelengths, so that the principle of measurement of the conventional apparatus does not fully match the principle of measurement by the dichotic thermometer, namely, does not fully meet a prerequisite that the dependency of the emissivity value on the wavelength can be ignored for two radiations the wavelengths of which are close to each other, leading to approximation $\epsilon_1 = \epsilon_2$. Thus, the conventional measuring apparatus suffers from a large amount of error included in the obtained surface temperature distribution.

On the other hand, JP-A-7-301569 discloses a method of obtaining a distribution of surface temperature according to dichroism using infrared radiations. This method employs an infrared-radiation camera for detecting the radiant intensity, two filters which permit transmission of respective two radiations having respective different wavelengths, and a mirror the angle of which is changed to permit an incident radiation to be incident upon a selected one of the two filters. According to the present method, the temperature is obtained on the basis of the radiant intensity ratio of obtained images of the object body, and the obtained temperature is displayed for each picture element of the images. Since the wavelengths of the radiations used are close to each other, it is considered that a difference in the emissivity is accordingly reduced, making it possible to reduce the amount of error included in the obtained temperature distribution. However, JP-A-7-301569 does not contain any description on a relationship between the characteristics of the two filters, and a technique that permits measurement of a temperature distribution with a sufficiently high degree of accuracy.

SUMMARY OF THE INVENTION

The present invention was made in view of the background art discussed above. It is a first object of the present invention to provide a method which permits accurate measurement of a distribution of surface temperature of an object body. A second object of the invention is to provide an apparatus suitable for practicing the method.

The first object may be achieved according to a first aspect of this invention, which provides a method of measuring a surface temperature of an object body, by calculating a temperature of the object body at each picture element of its image on the basis of a radiant intensity ratio at each pair of corresponding picture elements of a first and a second image which are obtained with respective radiations having respective first and second wavelengths and selected from a light emitted from a surface of the object body, the method comprising:

a first wavelength-selecting step of selecting the radiation having the first wavelength from the light emitted from the surface of the object body, by using a first filter which permits transmission therethrough a radiation having the first wavelength which is selected according to a radiant intensity curve corresponding to a wavelength of a black body at a lower limit of a range of the temperature to be measured, and which is within a high radiant intensity range in which the radiant intensity is higher than a radiant intensity at a normal room temperature; and a second wavelength-selecting step of selecting the radiation having the second wavelength from the light emitted from the surface of the object body, by using a second filter which permits transmission therethrough a radiation having the second wavelength which is selected within the high radiant intensity range, such that the second wavelength is different from the first wavelength by a predetermined difference which is not larger than $\frac{1}{3}$ of the first wavelength and which is not smaller than a sum of a half width of the first wavelength and a half width of the second wavelength.

The second object indicated above may be achieved according to a second aspect of the present invention, which provides an apparatus for measuring a surface temperature of an object body, by calculating a temperature of the object body at each picture element of its image on the basis of a radiant intensity ratio at each pair of corresponding picture elements of a first and a second image which are obtained with respective radiations having respective first and second wavelengths and selected from a light emitted from a surface of the object body, the apparatus comprising:

a first filter for selecting the radiation having the first wavelength from the light emitted from the surface of the object body, the first filter permitting transmission therethrough a radiation having the first wavelength which is selected according to a radiant intensity curve corresponding to a wavelength of a black body at a lower limit of a range of the temperature to be measured, and which is within a high radiant intensity range in which the radiant intensity is higher than a radiant intensity at a normal room temperature; and a second filter for selecting the radiation having the second wavelength from the light emitted from the surface of the object body, the second filter permitting transmission therethrough a radiation having the second wavelength which is selected within the high radiant intensity range, such that the second wavelength is different from the first wavelength by a predetermined difference which is not larger than $\frac{1}{3}$ of the first wavelength and which is not smaller than a sum of a half width of the first wavelength and a half width of the second wavelength.

In the method and apparatus of the invention as described above, the temperature of the object body at each picture element of its image is calculated on the basis of the radiant intensity ratio at each pair of corresponding picture elements of the first and second images and obtained with the respective radiations of the first and second wavelengths selected from the light emitted from the surface of the object body. Thus, the distribution of the surface temperature of the object body is measured on the basis of the temperature $T_{ij}$ at each picture element. To select the radiation having the first wavelength from the light emitted from the surface of the object body, the present invention uses the first filter which permits transmission therethrough a radiation having the first wavelength which is selected according to a radiant intensity curve corresponding to the wavelength of a black body at the lower limit of the range of the temperature to be measured, and which is within a high radiant intensity range in which the radiant intensity is higher than the radiant intensity at a normal room temperature. The present invention further uses the second filter which permits transmission therethrough a radiation having the second wavelength which is selected within the above-indicated high radiant intensity range, such that the second wavelength is different from the first wavelength by a predetermined difference which is not larger than $\frac{1}{3}$ of the first wavelength and which is not smaller than a sum of the half width of the first wavelength and the half width of the second wavelength. Accordingly, optical signals having sufficiently high radiation intensities can be obtained, leading to an accordingly high S/N ratio of the apparatus. In addition, the first and second wavelengths and are close to each other, so that the principle of measurement according to the present invention fully matches the principle of measurement by a dichotic thermometer, namely, fully meets a prerequisite that the dependency of the emissivity on the wavelength can be ignored for two radiations the wavelengths of which are close to each other, leading to approximation $\epsilon_1 = \epsilon_2$. Thus, the present measuring apparatus permits highly accurate measurement of the temperature distribution.

In the method and apparatus of the present invention, the first and second filters are preferably arranged such that the first filter permits transmission therethrough the radiation having the half width which is not larger than $\frac{1}{20}$ of the first wavelength, while the second filter permits transmission therethrough the radiation having the half width which is not larger than $\frac{1}{20}$ of the first wavelength. According to this arrangement, the radiations having the first and second wavelengths and are considered to exhibit a sufficiently high degree of monochromatism. Therefore, the present invention meets the prerequisite for the principle of measurement by a dichroic thermometer, resulting in an improved accuracy of measurement of the temperature distribution.

The first and second filters used in the method and apparatus of the invention are preferably arranged such that the first and second filters have transmittance values whose difference is not higher than 30%. This arrangement assures high sensitivity and S/N ratio, even for one of the two radiations of the first and second wavelengths which has a lower luminance value, permitting accurate measurement of the temperature distribution.

BRIEF DESCRIPTION OF THE DRAWINGS

The above and other objects, features, advantages and technical and industrial significance of the present invention will be better understood by reading the following detailed description of presently preferred embodiment of the invention, when considered in connection with the accompanying drawings, in which.

DETAILED DESCRIPTION OF THE PREFERRED EMBODIMENTS

Figure 1:
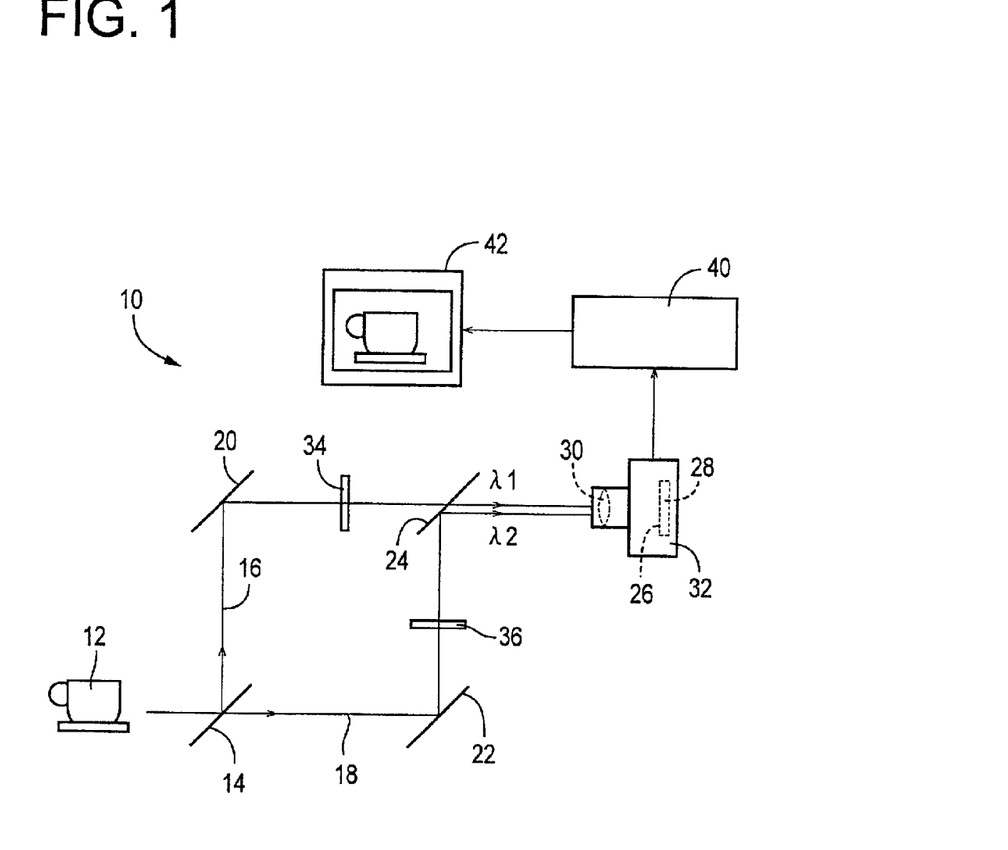
FIG. 1 is a view schematically illustrating an arrangement of a temperature-distribution measuring apparatus constructed according to one embodiment of this invention.

Referring to first to FIG. 1, there is shown an arrangement of a temperature-distribution measuring apparatus 10 of a first embodiment of this invention, wherein a light emitted from a surface of an object body 12 being heated within a firing furnace or a heating furnace is split by a half mirror (beam splitter) 14 into a first component traveling along a first optical path 16 and a second component traveling along a second optical path 18. The first and second optical paths 16, 18 are bent substantially at right angles by respective mirrors 20, 22, so that the first and second components are both incident upon a half mirror 24, and are reflected by the half mirror 24, so as to be incident upon an image detector 32 which has a CCD device 28 and a lens device 30. The CCD device 28 has a light detecting surface 26 on which are arranged a multiplicity of photosensitive elements. The lens device 30 is arranged to focus images of the object body 12 on the light detecting surface 26.

The first optical path 16 is provided with a first filter 34 which permits transmission therethrough a radiation having a first wavelength (band) $\lambda_1$ (e.g., center wavelength of 3.75 $\mu$m) and a half width of about 140 nm, for example. The second optical path 18 is provided with a second filter 36 which permits transmission therethrough a radiation having a second wavelength (band) $\lambda_2$ (e.g., center wavelength of 5.00 $\mu$m) and a half width of about 100 nm, for example. The first and second filers 34, 36 are so-called "interference filters" permitting transmission of radiations in selected wavelength bands, utilizing an optical interference.

Figure 2:
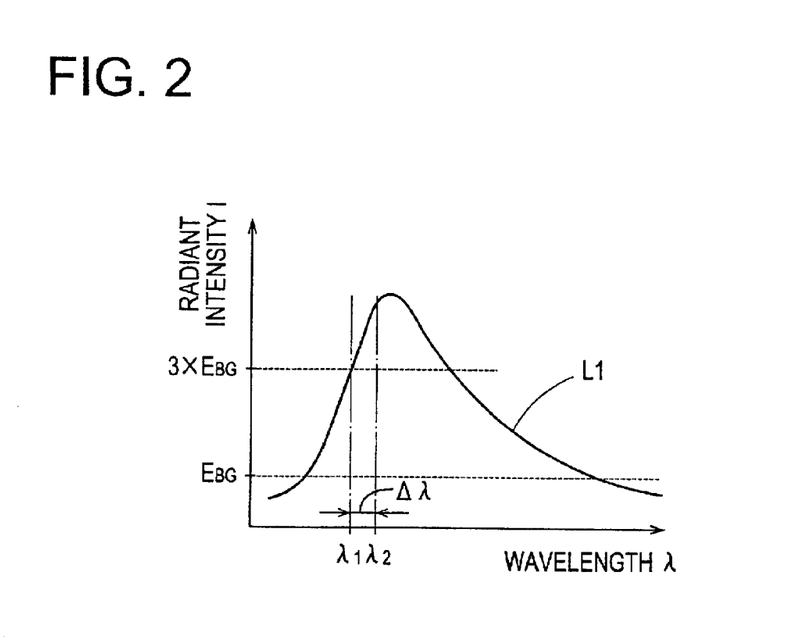
FIG. 2 is a view for explaining a manner of determining wavelengths $\lambda_1$ and $\lambda_2$ of respective first and second filters shown in FIG. 1.

The first and second wavelengths $\lambda_1$ and $\lambda_2$ are determined in the following manner, for instance. Initially, there is obtained according to the Planck's law a relationship between a wavelength and a radiant intensity of a black body at a lower limit (e.g., 500° C.) of a range of the temperature to be measured. Namely, a curve L1 shown in FIG. 2 is obtained. Then, a background radiant intensity $E_{BG}$ of the object body 12 is measured at a room temperature, for example, at 25° C. Next, the wavelength $\lambda$ at a desired point which lies on a portion of the curve L1 and which is larger than the background radiant intensity $E_{BG}$ multiplied by three, that is, larger than a value $3 \times E_{BG}$ is determined to be the first wavelength $\lambda_1$, so that the radiant intensity used for the measurement is high enough to prevent an error of measurement of the temperature. Then, the second wavelength is $\lambda_2$ determined to be larger or smaller than the first wavelength $\lambda_1$ by a predetermined difference $\Delta\lambda$, which is not larger than $\frac{1}{3}$ of the first wavelength $\lambda_1$. Where the first wavelength $\lambda_1$ is 3.75 $\mu$m, for example, the second wavelength $\lambda_2$ is determined to be 5.00 $\mu$m, which is larger than the first wavelength $\lambda_1$ by 1.25 $\mu$m. This manner of determination of the first and second wavelengths $\lambda_1$ and $\lambda_1$ is intended to satisfy an approximating equation (1) which represents the principle of measurement of a dichroic thermometer, which will be described. It is noted that the difference $\Delta\lambda$ between the first and second wavelengths $\lambda_1$ and $\lambda_2$ must be equal to or larger than a half width described below, in order to maintain a high degree of accuracy of measurement of the radiant intensity. For the radiations of the first and second radiations $\lambda_1$ and $\lambda_2$ to maintain properties of a monochromic light, the half widths must be equal to or smaller than $\frac{1}{20}$ of the center wavelengths, for example, equal to or smaller than about 180 nm. Further, the first and second filters 34, 36 have transmittance values whose difference is 30% or lower. If the difference were higher than 30%, the sensitivity of one of the two radiations of the first and second wavelengths $\lambda_1$ $\lambda_2$ which has a lower luminance value would be lowered, resulting in a reduced SIN ratio of the image detector 32 and an accordingly reduced accuracy of display of the temperature.

Thus, the temperature-distribution measuring apparatus 10 according to the present embodiment is arranged to select the two radiations having the respective first and second wavelengths $\lambda_1$ and $\lambda_2$ from the light emitted from the surface of the object body 12. To this end, the first filter 34 permits transmission therethrough the radiation having the first wavelength $\lambda_1$ and the first half width which is not larger than $\frac{1}{20}$ of that wavelength. The first wavelength $\lambda_1$ is selected according to the radiant intensity curve L1 corresponding to the wavelength of a black body at the lower limit of the range of the temperature to be measured, and within a high radiant intensity range in which the radiant intensity is sufficiently higher than the background radiant intensity $E_{BG}$ at a normal room temperature. On the other hand, the second filter 26 permits transmission therethrough the radiation having the second wavelength $\lambda_2$ and the second half width which is not larger than $\frac{1}{20}$ of that wavelength. The second wavelength $\lambda_2$ is selected within the above-indicated high radiant intensity range, such that the second wavelength $\lambda_2$ is different from the first wavelength $\lambda_1$ by a predetermined difference which is not larger than $\frac{1}{3}$ of the first wavelength $\lambda_1$ and which is not smaller than a sum of the above-indicated first and second half widths.

Figure 3:
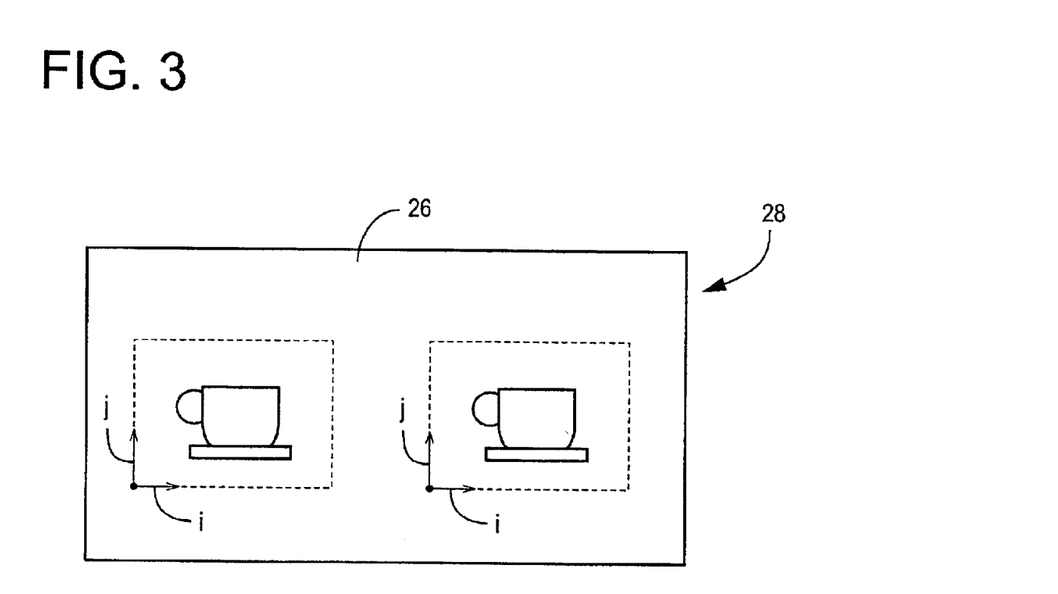
FIG. 3 is a view for explaining first and second images $G_1$ and $G_2$ formed on a light detecting surface 26 of an image detector 32 shown in FIG. 1.

In the optical system of FIG. 1, portions of the first and second optical paths 16, 18 between the half mirror 24 and the image detector 32 are spaced from each other by a small distance in a direction parallel to the light detecting surface 26 of the CCD device 28, in order to prevent overlapping of first and second images $G_1$ and $G_2$ formed on the light detecting surface 26. This spaced-apart relation of the optical paths 16, 18 is established by suitably orienting the respective mirrors 20, 22, so that the first and second images $G_1$ and $G_2$ of respective different wavelengths are formed on the light detecting surface 26 in a spaced-apart relation with each other. Described in detail by reference to FIG. 3, the first image $G_1$ is formed at a first position $B_1$ on the light detecting surface 26 of the CCD device 28 of the image detector 32, by the radiation having the first wavelength $\lambda_1$ selected by the first filter 34 from the light emitted from the surface of the object body 12, while the second image $G_2$ is formed at a second position $B_2$ on the light detecting surface 26, by the radiation having the second wavelength $\lambda_2$ selected by the second filter 36 from the light emitted from the surface of the object body 12, such that the first and second positions $B_1$ and $B_2$ are spaced apart from each other in the direction parallel to the light detecting surface 26, as indicated in FIG. 3. According to this arrangement, the multiple photosensitive elements arranged on the light detecting surface 26 detect the radiant intensity values at respective picture elements of the first image $G_1$, and the radiant intensity values at respective picture elements of the second image $G_2$, such that the picture elements correspond to the respective photosensitive elements. The mirrors 20, 22, half mirrors 14, 24 and lens device 30 cooperate with each other to constitute an optical imaging device capable of performing first and second wavelength-selecting steps of selecting the first and second wavelengths for concurrently forming respective images of the object body 12 at respective positions.

The arithmetic control device 40 is a so-called microcomputer incorporating a central processing unit (CPU), a random-access memory (RAM), a read-only memory (ROM) and an input-output interface. The CPU operates according to a control program stored in the ROM, to process input signals, namely, the output signals of the multiple photosensitive elements arranged on the light detecting surface 26, and control an image display device 42 to display a distribution of the surface temperature of the object body 12.

Referring to the flow chart of FIG. 4, there will be described a relevant portion of a control operation of the arithmetic control device 40. The control operation is initiated with step S1 to read the output signals of the multiple photosensitive elements arranged on the light detecting surface 26, for obtaining radiant intensity values $E_{1ij}$ at respective picture elements of the first image $G_1$, and radiant intensity values $E_{2ij}$ at respective picture elements of the second image $G_2$. Then, the control flow goes to step S2 corresponding to a radiant intensity ratio calculating step or means, to calculate a radiant intensity ratio $R_{ij}$ (=$E_{1ji}/E_{2ij}$) at each pair of corresponding picture elements of the first and second images $G_1$ and $G_2$ which are formed at the respective first and second positions $B_1$ and $B_2$ on the light detecting surface 26. The radiant intensity ratio $R_{ij}$ is a ratio of the radiant intensity value $E_{1ji}$ of the first wavelength $\lambda_1$ detected by the photosensitive element at each picture element of the first image $G_1$, to the radiant intensity value $E_{2ji}$ of the second wavelength $\lambda_2$ detected by the photosensitive element at the corresponding picture element of the second image $G_2$. Then, step S3 corresponding to a picture-element temperature calculating step or means is implemented to calculate a temperature $T_{ij}$ at each picture element of the image of the object body 12, on the basis of the calculated actual radiant intensity ratio $R_{ij}$ at each pair of corresponding picture elements of the first and second images $G_1$, $G_2$, and according to a predetermined relationship between the radiant intensity R and the temperature T as shown in FIG. 5, by way of example. Data representative of the predetermined relationship are stored in the ROM. For instance, the relationship as shown in FIG. 5 may be represented by the following equation 1, which is an approximating equation representing the principle of measurement of a dichroic thermometer. The equation 1 is formulated to permit determination of the surface temperature T of the object body 12 on the basis of the ratio R of the radiant intensity values at the respective different wavelengths $\lambda_1$ and $\lambda_2$, without having to use the emissivity of the object body 12. In the following equations, the second wavelength $\lambda_2$ is larger than the first wavelength $\lambda_1$, and "T", "$C_1$" and "$C_2$" respectively represent the absolute temperature, and first and second constants of Planck's law of radiation.

$$R=(\lambda_2/\lambda_1)^5 \exp[(C_2/T)\cdot(1/\lambda_2-1/\lambda_1)] \quad \text{(Equation 1)}$$

The above equation 1 is obtained in the following manner. That is, it is known that an intensity (energy) Eb of a radiation of a wavelength $\lambda$ emitted from a unit surface area of a blank body for a unit time, and the wavelength satisfy the following equation 2, which is the Planck's equation. It is also known that the following equation 3, which is the Wien's approximating equation, is satisfied when $\exp(C_2/\lambda T) \gg 1$. For ordinary bodies having gray colors, the following equation 4 is obtained by converting the equation 3 with insertion of the emissivity $\epsilon$. The following equation 5 is obtained from the equation 4, for obtaining the ratio R of the radiant intensity values $E_1$ and $E_2$ of the two wavelength values $\lambda_1$ and $\lambda_2$. Where the two wavelength values $\lambda_1$ and $\lambda_2$ are close to each other, the dependency of the emissivity $\epsilon$ on the wavelength can be ignored, that is, $\epsilon_1=\epsilon_2$. Thus, the above equation 1 is obtained. Accordingly, the temperatures T of object bodies having different emissivity values $\epsilon$ can be obtained without an influence of the emissivity.

$$Eb=C_1/\lambda^5[\exp(C_2/\lambda T)\times 1] \quad \text{(Equation 2)}$$

$$Eb=C_1 \exp(-C_2/\lambda T)/\lambda^5 \quad \text{(Equation 3)}$$

$$E=\epsilon\cdot C_1 \exp(-C_2/\lambda T)/\lambda^5 \quad \text{(Equation 4)}$$

$$E=(\epsilon_1/\epsilon_2)(\lambda_2/\lambda_1)^5 \exp[(C_2/T)\cdot(1/\lambda_2-1/\lambda_1)] \quad \text{(Equation 5)}$$

After the temperature $T_{ij}$ at each picture element of the image of the object body 12 has been calculated in step S3 as described above, the control flow goes to step S4 corresponding to a temperature-distribution displaying step or means, to display a distribution of the surface temperature of the object body 12, on the basis of the actual temperature $T_{ij}$ calculated at each picture element, and a predetermined relationship between the temperature T and the display color. Data representative of the predetermined relationship are stored in the ROM. FIG. 5 shows an example of the predetermined relationship between the temperature T and the display color. In this case, the distribution of the surface temperature of the object body 12 is shown in predetermined different colors.

There will be described an experimentation conducted by the present inventors, using the optical system shown in FIG. 1 wherein an infrared-radiation camera (e.g., model TH-5401 available from NEC Sanei Kabushiki Kaisha, Japan) is employed as the image detector 32, and the half mirrors 14, 24 are half mirrors for an infrared radiation, which reflect 30% of an incident radiation and transmit 30% of the incident radiation. The mirrors 20, 22 are plane mirrors BK7 of aluminum, and the first filter 34 permits transmission therethrough a radiation having a wavelength of 3.75 μm and a half width of 140 nm, while the second filter 36 permits transmission therethrough a radiation having a wavelength of 5.00 ξm and a half width of 100 nm. The object body 12 used in the experimentation is an alumina substrate (50×50×0.8 mm) the surface of which is locally covered with a baked black paint whose emissivity is different from that of the alumina substrate. This object body 12 was placed in a central part of a heating furnace, and the temperature within the furnace was raised from the room temperature up to 700° C. at a rate of 10° C./min. The distribution of the surface temperature of the alumina substrate was measured when the temperature within the furnace reached 500° C. during the rise up to 700° C. The experimentation under the conditions described above indicated an even distribution of the temperature of the alumina substrate over the entire surface, irrespective of the baked black paint which locally covers the surface of the aluminum substrate and which has the emissivity different from that of the aluminum substrate. The experimentation indicated a reproduction error of 2° C. of repeated measurements in a central part of the display screen of the display device 42.

A comparative experimentation under the same conditions as described above was made by using a comparative optical system arranged as shown in FIG. 2 of JP-7-301569. This experimentation indicated an uneven distribution of the surface temperature of the alumina substrate due to a time difference between the moments of detection of two images corresponding to the respective wavelengths, which time difference arises from a need of pivoting the mirror to selectively use the different wavelengths. This time difference caused a slight difference between the image of a surface area of the alumina substrate covered by the baked black paint the emissivity of which is different from that of the alumina substrate, and the image of the other surface area of the alumina substrate, so that there existed a difference of about 48° C. between the temperatures measured in the two surface areas. Further, the comparative experimentation indicated a reproduction error of 15° C. of repeated measurements in a central part of the display screen of the display device 42.

As described above, the present embodiment is arranged to calculate the temperature $T_{ij}$ of the object body 12 at each picture element of its image, on the basis of the radiant intensity ratio $R_{ij}$ at each pair of corresponding picture elements of the first and second images $G_1$ and $G_2$ obtained with the respective radiations of the first and second wavelengths $\lambda_1$ and $\lambda_2$ selected from the light emitted from the surface of the object body 12. Thus, the distribution of the surface temperature of the object body 12 is measured on the basis of the temperature $T_{ij}$ at each picture element. To select the radiation having the first wavelength $\lambda_1$ from the light emitted from the surface of the object body 12, the optical system of the present embodiment uses the first filter 34 which permits transmission therethrough the radiation having the first wavelength $\lambda_1$ which is selected according to the radiant intensity curve L1 corresponding to the wavelength of the black body at the substantially lower limit of the range of the temperature to be measured, and which is within a high radiant intensity range in which the radiant intensity is higher than the background radiant intensity $E_{BG}$ at a normal room temperature. The optical system further uses the second filter 26 which permits transmission therethrough the radiation having the second wavelength $\lambda_2$ which is selected within the above-indicated high radiant intensity range, such that the second wavelength $\lambda_2$ is different from the first wavelength $\lambda_1$ by a predetermined difference which is not larger than ⅓ of the first wavelength $\lambda_1$ and which is not smaller than a sum of a half width $\Delta\lambda_1$ of the first wavelength $\lambda_1$ and a half width $\Delta\lambda_2$ of the second wavelength $\lambda_2$. Accordingly, optical signals having sufficiently high radiation intensities can be obtained, leading to an accordingly high S/N ratio of the image detector 32. In addition, the first and second wavelengths $\lambda_1$ and $\lambda_2$ are close to each other, so that the principle of measurement of the present optical system fully matches the principle of measurement of a dichotic thermometer, namely, fully meets a prerequisite that the dependency of the emissivity on the wavelength can be ignored for two radiations the wavelengths of which are close to each other, leading to approximation $\epsilon_1=\epsilon_2$. Thus, the present measuring apparatus permits highly accurate measurement of the temperature distribution.

Further, the present embodiment is arranged such that the first filter 34 permits transmission therethrough the radiation having the half width $\Delta\lambda_1$ which is not larger than 1/20 of the first wavelength $\lambda_1$, while the second filter 36 permits transmission therethrough the radiation having the half width $\Delta\lambda_2$ which is not larger than 1/20 of the first wavelength $\lambda_2$, so that the radiations having these first and second wavelengths $\lambda_1$ and $\lambda_2$ are considered to exhibit a sufficiently high degree of monochromatism. Accordingly, the present embodiment meets the prerequisite for the principle of measurement by a dichroic thermometer, resulting in an improved accuracy of measurement of the temperature distribution.

In addition, the present embodiment is arranged such that the first and second filters 34, 36 have transmittance values whose difference is not higher than 30%, so that the present optical system has high sensitivity and S/N ratio, even for one of the two radiations of the first and second wavelengths $\lambda_1$ $\lambda_2$ which has a lower luminance value, permitting accurate measurement of the temperature distribution.

Other embodiments of the present invention will be described. In the following description, the same reference signs as used in the preceding embodiment will be used to identify the corresponding elements, which will not be described.

Figure 7:
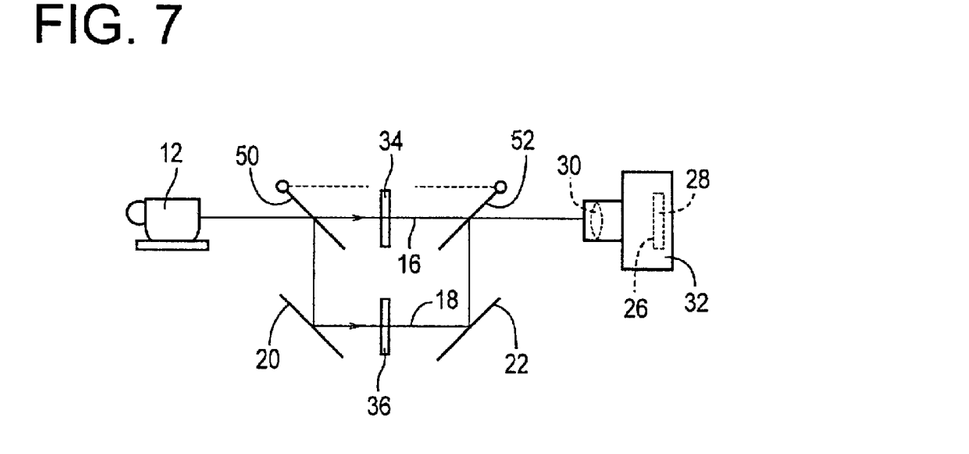
FIG. 7 is a view corresponding to that of FIG. 1, illustrating an optical system of a temperature-distribution measuring apparatus according to another embodiment of this invention.

Referring to FIG. 7, there is schematically illustrated an arrangement of a temperature-distribution measuring apparatus according to another embodiment of this invention. In the embodiment of FIG. 7, a pair of mirrors 50, 52 are disposed such that each of these mirrors 50, 52 is pivotable about its fixed end between a first position indicated by broken line and a second position indicated by solid line. When the mirrors 50, 52 are placed in the first position, a light emitted from the surface of the object body 12 is incident upon the image detector 32 along the first optical path 16 When the mirrors 50, 52 are placed in the second position, the light is incident upon the image detector 32 along the second optical path 18. As in the preceding embodiment, the first optical path 16 is provided with the first filter 34, while the second optical path 18 is provided with the second filter 36, so that the first and second images $G_1$ and $G_2$ are formed by the respective two radiations having the respective first and second wavelengths $\lambda_1$ and $\lambda_2$, with a predetermined time difference. Thus, the present embodiment has the same advantage as the preceding embodiment.

Figure 8:
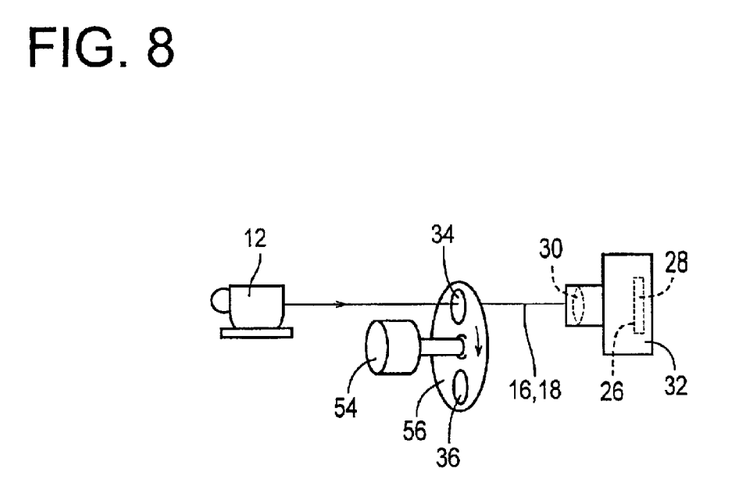
Fig. 8 is a view corresponding to that of Fig. 1, illustrating an optical system of a temperature-distribution measuring apparatus according to a further embodiment of this invention.

In an embodiment shown in FIG. 8, a rotary disc 56 is disposed such that the rotary disc 56 is rotatable by an electric motor 54, about an axis which is parallel to an optical path extending between the object body 12 and the image detector 32 and which is offset from the optical path in a radial direction of the rotary disc 56, by a suitable distance. The rotary disc 56 carries the first filter 34 and the second filter 36 such that these first and second filters 34, 36 are selectively aligned with the optical path by rotation of the rotary disc 56 by the electric motor 54. The first image $G_1$ is formed with the radiation which has the first wavelength $\lambda_1$ and which has been transmitted through the first filter 34, and the second image $G_2$ is formed with the radiation which has the second wavelength $\lambda_2$ and which has been transmitted through the second filter 36. These first and second images $G_1$ and $G_2$ are successively obtained by rotating the rotary disc 56. Thus, the present embodiment has the same advantages as the preceding embodiments. In the present embodiment, the first optical path 16 and the second optical path 18 are considered to be selectively established between the rotary disc 56 and the image detector 32.

Figure 9:
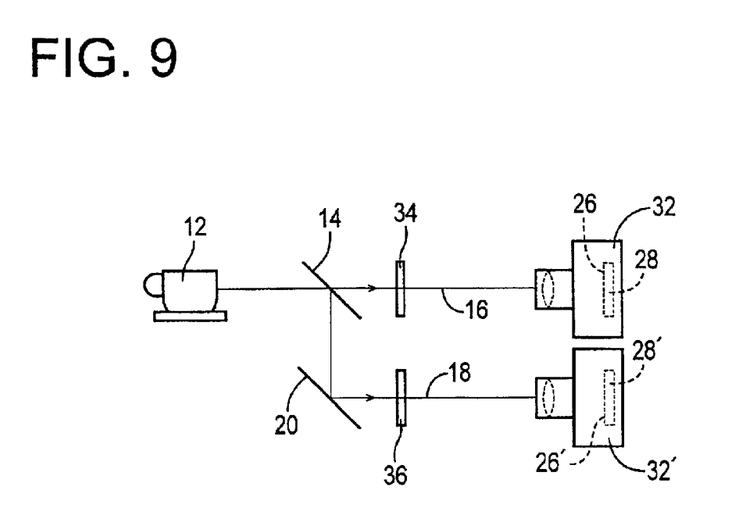
FIG. 9 is a view corresponding to that of FIG. 1, illustrating an optical system of a temperature-distribution measuring apparatus according to a still further embodiment of this invention.

In an embodiment of FIG. 9, the light emitted from the surface of the object body 12 is split by the half mirror 14 into a first component traveling along the first optical path 16 and a second component traveling along the second optical path 18. The first optical path 16 is provided with the first filter 34, and the first component which has been transmitted through the first filter 34 is incident upon the image detector 32. On the other hand, the second optical path 16 is provided with the second filter 36, and the second component which has been transmitted through the second filter 36 is incident upon another image detector 32'. The first and second filters 34, 36 may be incorporated within the respective image detectors 32, 32'. In the present embodiment, too, the first image $G_1$ is formed with the radiation having the first wavelength $\lambda_1$ which is selected from the light emitted from the surface of the object body 12, as a result of transmission of the light through the first filter 34, and at the same time the second image $G_2$ is formed with the radiation having the second wavelength $\lambda_2$ which is selected from the light from the object body 12 as a result of transmission of the light through the second filter 36. Thus, the present embodiment has a result of experimentation as obtained in the first embodiment of FIG. 1.

While the preferred embodiments of the present invention have been described in detail by reference to the drawings, it is to be understood that the present invention may be otherwise embodied.

In the illustrated embodiments, the first and second wavelengths $\lambda_1$ and $\lambda_2$ are selected according to the radiant intensity curve L1 of FIG. 2 corresponding to the wavelength of the black body at the lower limit of the range of the temperature to be measured, and which is within a high radiant intensity range in which the radiant intensity is at least three times the background radiant intensity $E_{BG}$ at a normal room temperature. However, the radiant intensity need not be at least three times the background radiant intensity $E_{BG}$, since the principle of the present invention is satisfied as long as the radiant intensity is sufficiently higher than the background radiant intensity $E_{BG}$ at the normal room temperature.

In the illustrated embodiments, the half width $\Delta\lambda_1$ of the first wavelength $\lambda_1$ is equal to or smaller than $\frac{1}{20}$ of the first wavelength $\lambda_1$, and the half width $\lambda_2$ of the second wavelength $\lambda_2$ is equal to or smaller than $\frac{1}{20}$ of the first wavelength $\lambda_2$. However, the half widths need not be equal to or smaller than $\frac{1}{20}$ of the wavelength values, but may be slightly larger than $\frac{1}{20}$ of the wavelength values, according to the principle of the invention.

In the illustrated embodiments, a difference of the transmittance values of the first and second filters 34, 36 is equal to or smaller than 30%. However, the difference need not be to equal to or smaller than 30%, but may be slightly larger than 30%, according to the principle of the invention.

Figure 4:
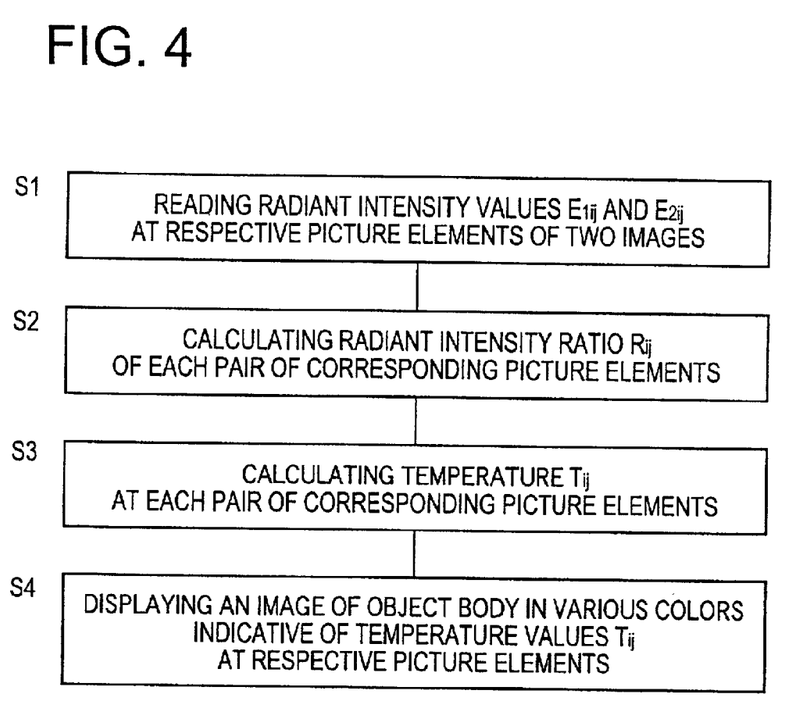
FIG. 4 is a flow chart for explaining a relevant part of a control operation performed by an arithmetic control device shown in FIG. 1.
Figure 5:
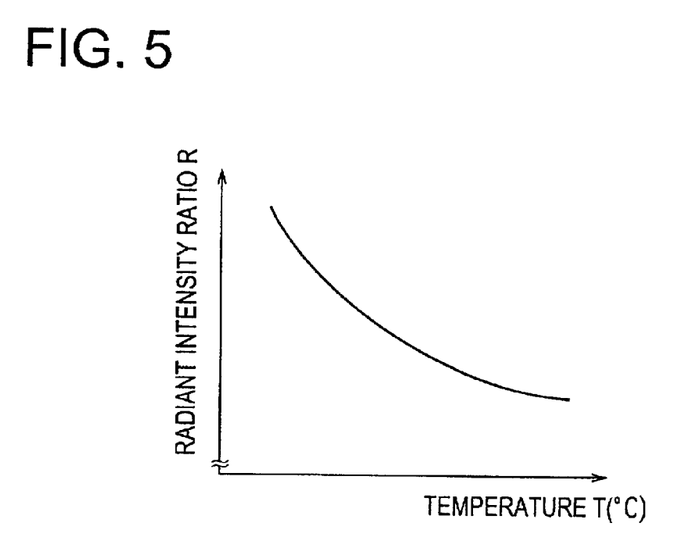
FIG. 5 is a view indicating a relationship used in a picture-element temperature calculating step of FIG. 4, to obtain a surface temperature T from a radiant intensity ratio R.
Figure 6:
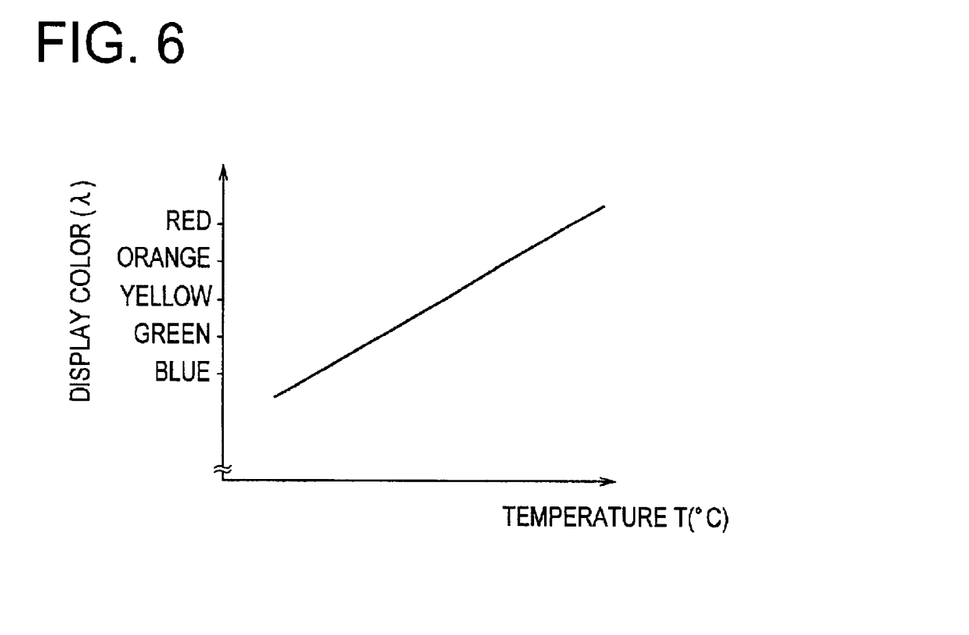
FIG. 6 is a view indicating a relationship used in a temperature-distribution displaying step of FIG. 4, to determine a display color from the surface temperature T.

Although the surface temperature of the object body 12 is indicated in different colors in step S4 of FIG. 4, the surface temperature may be indicated in any other fashion, for example, by contour lines or in different density values.

While the image detector 32, 32' used in the illustrated embodiments uses the CCD device 28 having the light detecting surface 26, the image detector may use any other light sensitive element such as a color image tube.

It is to be understood that the present invention may be embodied with various other changes, modifications and improvements, which may occur to those skilled in the art, in the light of the technical teachings of the present invention which have been described.

What is claimed is:

1. A method of measuring a surface temperature of an object body, by calculating a temperature of the object body at each picture element of its image on the basis of a radiant intensity ratio at each pair of corresponding picture elements of a first and a second image which are obtained with respective radiations having respective first and second wavelengths and selected from a light emitted from a surface of said object body, said method comprising:

a radiation intensity detecting step of detecting radiation intensity at radiations having said first and second wavelength from the object body;

a first wavelength-selecting step of selecting said radiation having said first wavelength from the light emitted from the surface of said object body, by using a first filter which permits transmission therethrough a radiation having said first wavelength which is selected according to a radiant intensity curve corresponding to a wavelength of a black body at a lower limit of a range of the temperature to be measured, and which is within a high radiant intensity range in which the radiant intensity is higher than a radiant intensity at a normal room temperature;

a second wavelength-selecting step of selecting said radiation having said second wavelength from the light emitted from the surface of said object body, by using a second filter which permits transmission therethrough a radiation having said second wavelength which is selected within said high radiant intensity range, such that said second wavelength is different from said first wavelength by a predetermined difference which is not larger than $\frac{1}{3}$ of said first wavelength and which is not smaller than a sum of a half width of said first wavelength and a half width of said second wavelength; and a surface temperature determining step of determining from said first and second images which are obtained with respective radiations having respective first and second wavelengths which are respectively selected in said first and second wavelength-selecting steps, the surface temperature of said object body.

2. A method according to claim 1, wherein said first filter permits transmission therethrough a radiation having a half width which is not larger than $\frac{1}{20}$ of said first wavelength, while said second filter permits transmission therethrough a radiation having a half width which is not larger than $\frac{1}{20}$ of said first wavelength.

3. A method according to claim 1, wherein said first and second filters have transmittance values whose difference is not higher than 30%.

4. An apparatus for measuring a surface temperature of an object body, by calculating a temperature of the object body at each picture element of its image on the basis of a radiant intensity ratio at each pair of corresponding picture elements of a first and a second image which are obtained with respective radiations having respective first and second wavelengths and selected from a light emitted from a surface of said object body, said apparatus comprising:

a radiation intensity detecting means for detecting radiation intensity at radiations having said first and second wavelength from the object body;

a first filter for selecting said radiation having said first wavelength from the light emitted from the surface of said object body, said first filter permitting transmission therethrough a radiation having said first wavelength which is selected according to a radiant intensity curve corresponding to a wavelength of a black body at a lower limit of a range of the temperature to be measured, and which is within a high radiant intensity range in which the radiant intensity is higher than a radiant intensity at a normal room temperature;

a second filter for selecting said radiation having said second wavelength from the light emitted from the surface of said object body, said second filter permitting transmission therethrough a radiation having said second wavelength which is selected within said high radiant intensity range, such that said second wavelength is different from said first wavelength by a predetermined difference which is not larger than $\frac{1}{3}$ of said first wavelength and which is not smaller than a sum of a half width of said first wavelength and a half width of said second wavelength;

an image detector including a multiplicity of photosensitive elements operable in response to the radiations of said first and second wavelengths, to form two images of said object body on the basis of said radiations of said first and second wavelengths; and a surface temperature determining means for determining from said first and second images which are obtained with respective radiations having respective first and second wavelengths which are respectively selected by said first and second wavelength-selecting filters, the surface temperature of said object body.

5. An apparatus according to claim 4, wherein said first filter permits transmission therethrough a radiation having a half width which is not larger than 1/20 of said first wavelength, while said second filter permits transmission therethrough a radiation having a half width which is not larger than 1/20 of said first wavelength.

6. An apparatus according to claim 4, wherein the first and second filters have transmittance values whose difference is not higher than 30%.

7. An apparatus according to claim 4, further comprising:
a first half mirror for splitting said light emitted from the surface of said object body into two components traveling along respective first and second optical paths which are provided with said first and second filters, respectively; and
a second half mirror disposed so as to receive the radiations of said first and second wavelengths from said first and second filters, wherein said image detector forms said two images of said object body such that said two images are spaced apart from each other.

8. An apparatus according to claim 4, further comprising:
a pair of mirrors each movable between a first position in which the light emitted from the surface of said object body travels along a first path provided with said first filter, and a second position in which a corresponding one of said pair of mirrors reflects said light such that the light travels along a second optical path provided with said second filters, wherein said image detector forms said two images of said object body such that said two images are spaced apart from each other.

9. An apparatus according to claim 4, further comprising:
a rotary disc carrying said first and second filters fixed thereto and rotatable about an axis parallel to an optical path which extends from said object body, said first and second filters being disposed on said rotary disc such that said first and second filters are selectively aligned with said optical path, by rotation of said rotary disc; and
an electric motor operable to rotate said rotary disc, wherein said image detector forms said two images of said object body such that said two images are spaced apart from each other.

10. An apparatus according to claim 4, further comprising:
a half mirror for splitting said light emitted from the surface of said object body into two components traveling along respective first and second optical paths which are provided with said first and second filters, respectively, wherein said image detector including a pair of image detectors disposed to receive the radiations of said first and second wavelengths, respectively, each of said pair of image detectors including a multiplicity of photosensitive elements operable in response to a corresponding one of the radiations of said firs and second wavelengths, to an image of said object body on the basis of said corresponding radiation.

\* \* \* \* \*